J. FASKE.
TIRE.
APPLICATION FILED MAR. 29, 1919.

1,326,444.

Patented Dec. 30, 1919.

Inventor
Joseph Faske,
By
Attorneys

UNITED STATES PATENT OFFICE.

JOSEPH FASKE, OF DETROIT, MICHIGAN.

TIRE.

1,326,444.     Specification of Letters Patent.     Patented Dec. 30, 1919.

Application filed March 29, 1919. Serial No. 286,132.

*To all whom it may concern:*

Be it known that I, JOSEPH FASKE, a citizen of the United States of America, residing at Detroit, in the county of Wayne and State of Michigan, have invented certain new and useful Improvements in Tires, of which the following is a specification, reference being had therein to the accompanying drawings.

This invention relates to tires, and has special reference to that type of automobile tire which has a detachable rim and a solid or semi-solid rubber tire.

The primary object of my invention is to obviate the necessity of using an inner pneumatic tube in the outer casing of a tire, and substitute for the ordinary inner pneumatic tube a solid or semi-solid filler which is practically puncture proof and maintains essentially the same degree of resiliency for a tire as that ordinarily provided by an inner pneumatic tube.

Another object of my invention is to provide a novel sectional detachable rim for a wheel and means in connection with the rim to prevent creeping of a tire thereon and creeping or circumferential movement of the rim relative to a wheel felly.

A further object of my invention is to provide an automobile tire wherein the parts are constructed with a view of reducing the cost of manufacture and at the same time retain those features by which safety, durability and ease of assembling are secured.

With such ends in view, my invention resides in the novel construction to be hereinafter considered and then claimed.

Reference will now be had to the drawings, wherein—

Figure 1:
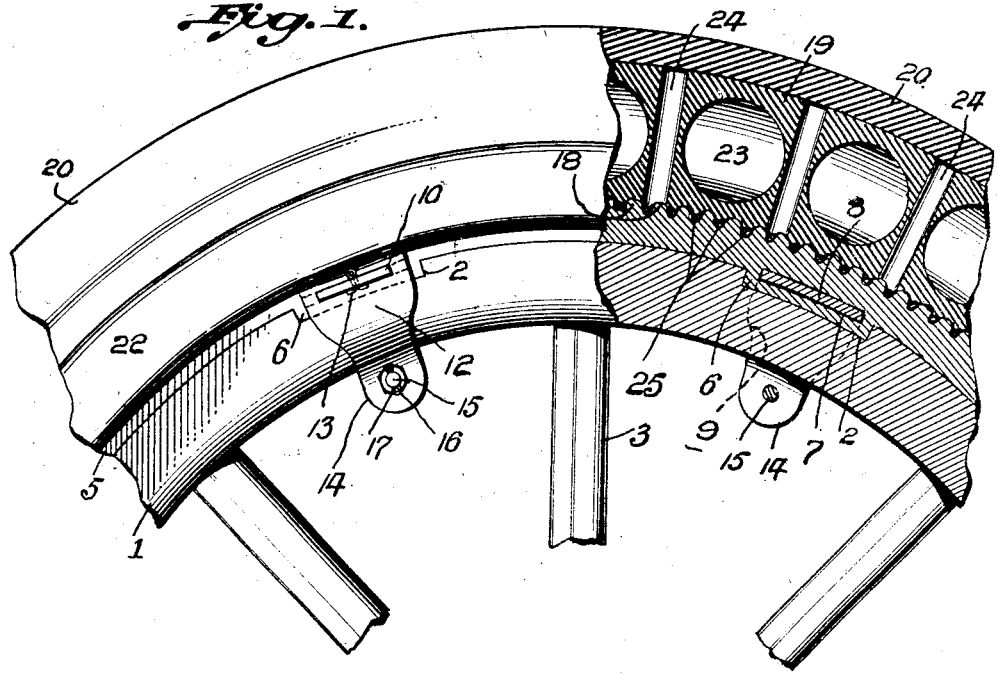
Figure 2:
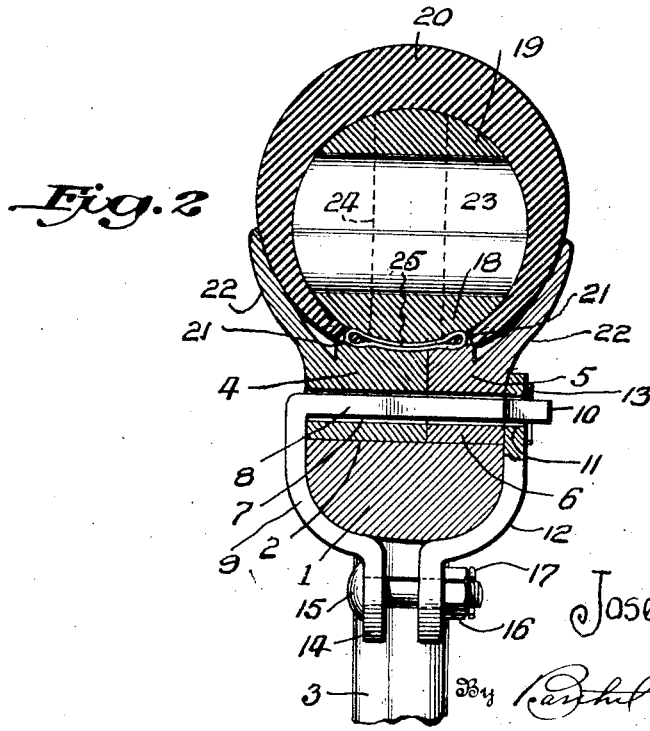

Figure 1 is a side elevation of a portion of a wheel provided with a tire, which is partly broken away and partly in section, and Fig. 2 is a cross sectional view of the same.

In the drawing, the reference numeral 1 denotes a portion of a wheel felly having the periphery thereof provided with equally spaced transverse grooves 2, and said felly is supported by spokes 3.

On the wheel felly 1 is a sectional rim composed of circumferential abutting sections 4 and 5, the former being of greater width than the latter, so that the section 5 can be readily removed without disturbing the section 4. Both of the sections have transverse tongues 6 adapted to fit in the grooves 2 of the felly 1 and prevent circumferential shifting of the sectional rim on the felly, and said tongues are formed with transverse openings 7, which aline and receive fastening means for retaining the sectional rim on the wheel felly. The fastening means comprises a felly engaging member 9 having a lateral portion or arm 8 extending through the alining openings 7 of the tongues 6 with the outer end of the arm 8 terminating in a tongue 10 extending through a slot 11 in the outer end of another felly engaging member 12. The member 12 is retained in engagement with the tongue 10 by a cotter pin 13 or other fastening means, and the members 9 and 12 have apertured ears 14 connected by bolts 15, nuts 16 and cotter pins 17, said cotter pins preventing accidental displacement of the nuts 16 relative to the bolts 15. The felly engaging members 12 are preferably at the outer side of the wheel and by removing the fastening devices of the rim, the section 5 of the rim may be shifted from the wheel felly to permit of easy access being had to a tire supported by said rim.

The periphery of the rim sections 4 and 5 is transversely corrugated, as at 18, and these corrugations are adapted to engage in a solid or semi-solid inner tube or filler 19 within an outer casing 20 having perforated edges 21 connected by laces 25 that extend through the corrugations 18. The rim sections 4 and 5 have side flanges 22 that hold the outer casing 2 on the rim sections 4 and 5. With the inner tube or filler made of rubber, it can be provided with transverse openings 23 and small openings 24, the latter being radially disposed relative to the axis of the wheel. The transverse and radial openings 23 and 24 will afford air pockets when closed by the outer casing 20 of the tire, and with the inner tube or filler made of rubber, the air pockets will coöperate with the resiliency of the rubber in providing a cushion member circumferentially of the wheel.

From the foregoing, it will be observed that the inner tube or filler cannot creep or shift circumferentially of the sectional rim, and that said sectional rim is also held against a similar movement by the transverse tongues extending into the grooved periphery of the wheel felly.

While in the drawing there is illustrated a preferred embodiment of my invention, it is to be understood that the structural elements are susceptible to such changes, in size, shape and manner of assemblage as fall within the scope of the appended claim.

What I claim is:—

The combination of a wheel felly provided with transverse grooves, a rim on said felly adapted for holding a tire and provided with tongues extending into the grooves of said felly, the tongues of said rim having openings, felly engaging members having the outer ends thereof at the outer side of said felly and the inner ends thereof on said felly, felly engaging members having the outer ends thereof extending through the openings in the rim tongues and through the outer ends of the first mentioned felly engaging members, means connecting the outer ends of the felly engaging members at each rim tongue, and means connecting the inner ends of said felly engaging members.

In testimony whereof I affix my signature in the presence of a witness.

JOSEPH FASKE.

Witness:
KARL H. BUTLER.